United States Patent
Schmidt et al.

(10) Patent No.: US 6,202,414 B1
(45) Date of Patent: Mar. 20, 2001

(54) METHOD AND APPARATUS FOR REGULATING A SUPERCHARGED INTERNAL COMBUSTION ENGINE

(75) Inventors: Erwin Schmidt, Baltmannsweiler; Siegfried Sumser, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/336,720

(22) Filed: Jun. 21, 1999

(30) Foreign Application Priority Data

Jun. 20, 1998 (DE) .............................. 198 27 627

(51) Int. Cl.$^7$ .............................. F02B 37/007
(52) U.S. Cl. .............................. 60/612; 60/605.2
(58) Field of Search ..................... 60/605.2, 612

(56) References Cited

U.S. PATENT DOCUMENTS

| | | |
|---|---|---|
| 4,660,382 | 4/1987 | Ueno et al. . |
| 5,090,204 | 2/1992 | Bonitz et al. . |
| 5,611,202 | * 3/1997 | Sumser et al. .................... 60/612 |
| 5,845,495 | * 12/1998 | Schray et al. .................... 60/612 |

FOREIGN PATENT DOCUMENTS 38 32 965    4/1990  (DE) .

* cited by examiner

*Primary Examiner*—Michael Koczo
(74) *Attorney, Agent, or Firm*—Evenson, McKeown, Edwards & Lenahan, P.L.L.C.

(57) ABSTRACT

A method and apparatus for regulating a supercharged internal combustion engine that has two rows of cylinders, with an exhaust turbocharger associated with each row, a control signal for adjusting at least one exhaust turbocharger is generated in a regulating unit, taking into account state parameters that describe the operating state of the engine. In order to supply the supercharged internal combustion engine uniformly with combustion air to regulate the engine, a state parameter is measured in the vicinity of the compressor of the exhaust turbocharger and a regulating parameter is formed from the state parameter according to a given control law. The control parameter is supplied as a control signal to a control member that influences the effective turbine cross section.

16 Claims, 2 Drawing Sheets

METHOD AND APPARATUS FOR REGULATING A SUPERCHARGED INTERNAL COMBUSTION ENGINE

BACKGROUND AND SUMMARY OF THE INVENTION

This application claims the priority of German Application No. 198 27 627.3, filed Jun. 20, 1998, the disclosure of which is expressly incorporated by reference herein.

The invention relates to a method and apparatus for regulating a supercharged internal combustion engine having two rows of cylinders with an exhaust turbocharger being associated with each row of cylinders, and with a regulating unit in which, taking into account state parameters that describe the operating state of the engine, a control signal is generated to adjust at least one exhaust turbocharger.

A multicylinder internal combustion engine with two parallel exhaust turbochargers is known from U.S. Pat. No. 5,090,204 or German Patent document DE 38 32 965 A1 (which is the patent application from which U.S. Pat. No. 5,090,204 claims priority) . The symmetrically constructed engine consists of two banks of cylinders with an exhaust turbocharger associated with each bank. The turbines are driven by the exhaust in the exhaust line of each cylinder bank. The associated compressor is located in the intake manifold associated with this bank of cylinders.

In order to maintain the boost pressure in the intake manifolds of both cylinders at the same level, a regulating unit is provided that equalizes the differential pressure between the boost pressures in the intake manifolds downstream of the compressors. When a certain deviation occurs, a regulating signal is generated. The regulating signal is used to adjust a throttle located in a bypass line of the respective turbine. As a result, the turbine power, and consequently the compressor performance as well, can be influenced, whereupon an adjusted boost pressure is set in the intake system.

Because of the intrinsic dynamics of the system to be regulated, consisting of turbines, compressors, and throttles, this behavior has the disadvantage that the desired equalization of the boost pressure between the two intake manifolds is established only after a time delay. The regulating intervention at the throttle in the bypass of the turbine initially produces a change in the exhaust counterpressure upstream of the turbine. This change results in a modified turbine power which in turn acts on the boost pressure with a time delay. Particularly during non-steady-state operation of the engine, because of the time-delayed occurrence of the regulatory intervention, an undesired boost pressure differential can be established between the intake manifolds of the two rows of cylinders, so that a non-uniform charging of the cylinders in the two rows of cylinders with combustion air can result.

Another charged internal combustion engine is known from U.S. Pat. No. 4,660,382. Here, the engine is equipped only a single exhaust turbocharger provided with variable turbine geometry for a variable adjustment of the effective turbine cross section. In this device, the boost pressure is measured downstream of the compressor and serves as the basis of the setting of the variable turbine geometry. However, the coordination of the operation of two exhaust turbochargers, one for each row of cylinders, is not the subject of U.S. Pat. No. 4,660,382.

The problem addressed by the invention is to uniformly supply combustion air to a supercharged internal combustion engine having two rows of cylinders with an exhaust turbocharger for each row, especially at all operating points and during non-steady-state operation.

This problem is solved by a method and apparatus according to the present invention. With the method according to the present invention, a state parameter of the engine is measured directly in the compressor or in the vicinity of a compressor, especially a state parameter that is proportional to the air mass flow through the compressor. As a result, a state parameter is established as the basis of regulation that represents measurement of the supply of combustion air to the rows of cylinders. Advantageously, a state parameter is measured in the vicinity of the compressor inlet.

The generated control signal is fed to a control member which directly influences the effective turbine cross section. Advantageously, the turbines of both exhaust turbochargers are provided with variably adjustable turbine geometry. By means of the control member, the effective turbine cross section can be adjusted. A control signal generated in the regulating unit in accordance with the regulating guideline employed is supplied to the control member. Depending on the regulating strategy employed, the state parameter can be regulated by adjusting one or both variable turbine geometries.

The non-steady-state behavior of the engine is particularly improved because deviations in regulation are detected directly and can be compensated more rapidly. The same air mass flow passes through both compressors, and any differences that may result from manufacturing tolerances for example are compensated. This results resulting in improved fuel consumption and low emissions. The regulating section is limited to sizes and engine components that have a direct influence on the air mass flow transmitted.

Differential regulation can be employed as an especially simple and rapidly performed type of regulation. Here, the difference between two variable physical engine state parameters is advantageously measured in the vicinity of the compressor inlet. Preferably, the state parameters include the air mass flow at the compressor inlet, the rpm of the exhaust turbocharger or the diffuser pressure (which is tapped in the inlet area of the compressor diffusers of the turbochargers). The difference between the two exhaust turbochargers is measured from these state parameters, advantageously with the aid of a differential sensor, and used as the basis for regulation. In differential regulation, in an advantageous fashion, the differential value is set to a reference value which is advantageously equal to zero, so that these state parameters assume the same setpoint in the vicinity of both compressor inlets.

According to another regulation method, the state parameter of only one exhaust turbocharger is compared with a set parameter. A differential value is formed from the difference between the state parameters of the first and second exhaust turbochargers. The state parameters of the first exhaust turbocharger and the differential value are added together. At least one of the two state parameters is varied to the point where a differential value assumes a reference value, especially zero. In this design, the exhaust turbocharger, whose state parameter is compared with the setpoint, assumes the task of a lead element. The state parameter of this turbocharger is initially regulated to the setpoint. The other exhaust turbocharger is set to follow the lead exhaust turbocharger, in which the difference between the state parameter of this turbocharger and the state parameter of the lead turbocharger is set to zero, so that the state parameters of both turbochargers assume the same value. The division into a lead and a following turbocharger has the advantage that only the absolute setpoint for the state parameter of the lead turbocharger must be specified, while on the other hand the state parameter of the following turbocharger is adjusted by differential regulation. Such regulation is simple to perform and sturdy from the regulation standpoint.

The setpoint can be added from a compressor characteristic map stored in the regulating unit, said map representing the relationship between the mass throughput and the total pressure ratio at different turbocharger rpm values. In the characteristic map, a plurality of engine operating curves for specific positions of the variable turbine geometry and certain engine rpm values can be stored for various engine loads and engine operating loads such as operation with acceleration or engine braking operation.

It is also possible to provide an exhaust recycling device that includes a recycling line and an adjustable, especially a regulatable, shutoff valve. In this case, state parameters of the exhaust recycling operation can also be stored in the compressor characteristic map.

Other objects, advantages and novel features of the present invention will become apparent from the following detailed description of the invention when considered in conjunction with the accompanying drawings.

DETAILED DESCRIPTION OF THE DRAWINGS

Figure 1:
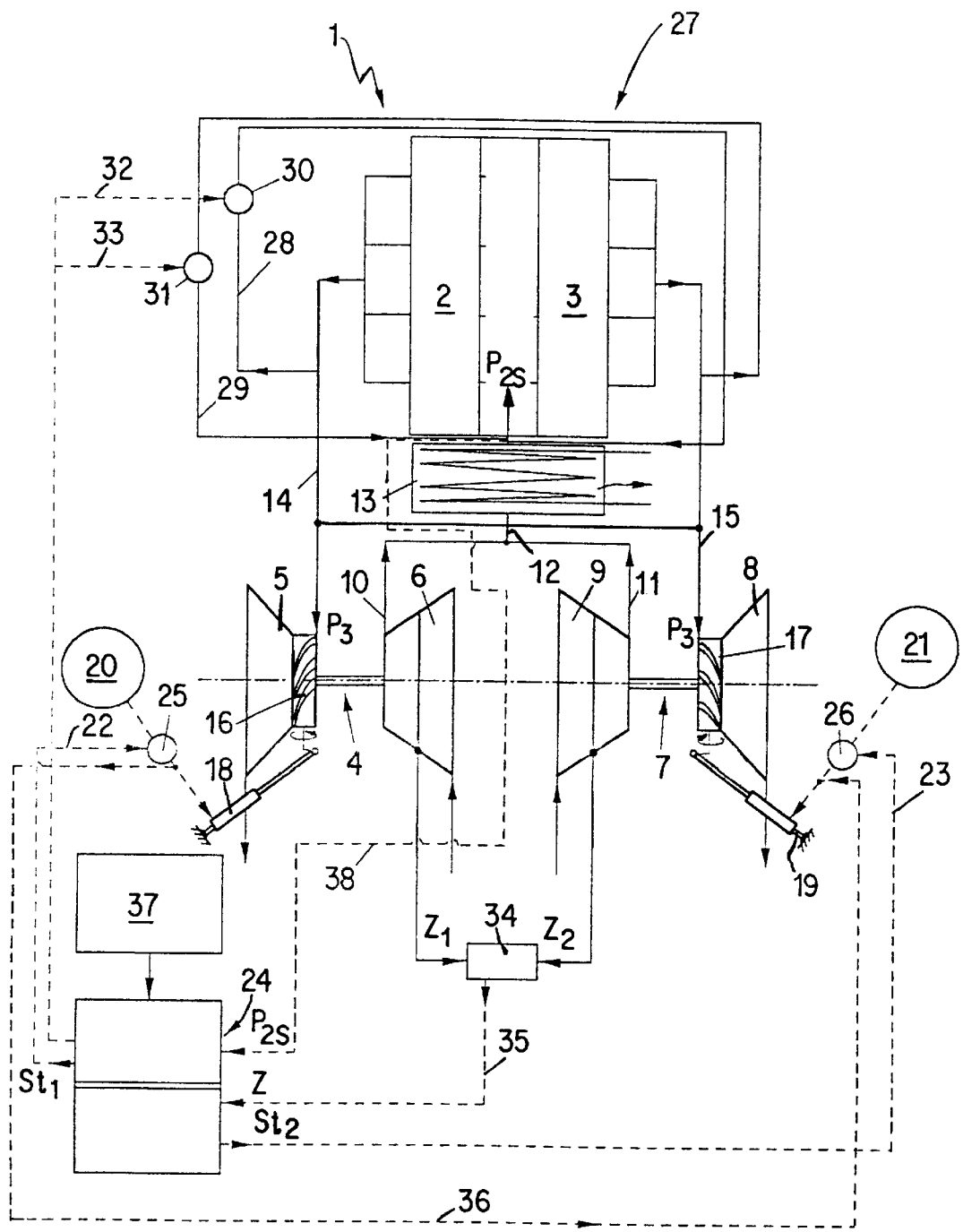
FIG. 1 is a schematic representation of an internal combustion engine with two rows of cylinders and an exhaust turbocharger in each row of cylinders.

The internal combustion engine 1 of a motor vehicle, shown in FIG. 1, has two rows of cylinders 2, 3 each with a plurality of cylinders. In order to supply compressed combustion air to the cylinders, an exhaust turbocharger 4, 7 is associated with each row of cylinders 2, 3. The exhaust turbocharger 4 associated with row of cylinders 2 consists of a turbine 5 in a first exhaust line 14 that branches off from the first row of cylinders 2 and of a compressor 6 in a first intake line 10 connected by a shaft with turbine 5. The exhaust turbocharger 7 associated with the second row of cylinders 3 is arranged mirrorwise with respect to the first exhaust turbocharger 4. The second exhaust turbocharger 7 consists of a turbine 8 in a second exhaust line 15 that branches off from the second row of cylinders 3 and a compressor 9 in a second intake line 11 connected by a shaft with turbine 8.

The two intake lines 10,11 terminate downstream of compressors 6, 9 in a common intake line section 12 through which the compressed fresh air is supplied to the engine at a uniform boost pressure P2S for both rows of cylinders 2, 3. The compressed air is cooled in a boost air cooler 13 before entering the intake of the engine.

It may be advantageous to make the intake lines for both rows of cylinders separate, so that no mixing of the pressures between the two intake lines is possible. Each row of cylinders is supplied with the boost pressure delivered by the corresponding compressor.

Exhaust lines 14, 15 are made separate for the two rows of cylinders 2, 3 so that each turbine 5, 8 is supplied with a separate exhaust counterpressure P3. Here again it may be advantageous in certain cases to provide a connection between the two exhaust lines 14, 15 in order to equalize the pressures.

Both exhaust turbochargers 4, 7 are designed with a variably adjustable turbine geometry that makes it possible to increase or decrease the effective turbine cross section. The variable turbine geometry is made in the embodiment as an adjustable guide grid 16, 17 on the first turbine 5 or on the second turbine 8 which can be set by control members 18, 19 to the desired position. The control members 18, 19 are supplied by energy sources 20, 21 with control energy depending on the type of control member, pressure or voltage. To adjust the guide grids 16, 17, the control members 18, 19 are connected by signal lines 22, 23 with a regulating unit 24 in which control signals St1, St2 are produced. The control signals St1, St2 for control members 18, 19 are converted in modulators 25, 26 into a signal that physically corresponds to energy sources 20, 21.

Control members 18, 19 can be connected directly with one another by communication lines 36. Advantageously, a signal exchange is performed via communication line 36 in order to set both turbines to the same effective turbine cross section. It can be expedient to have the first turbocharger 4 as a lead turbocharger that is regulated to a desired setpoint and the second turbocharger 7 as following the first turbocharger 4. A first unregulated comparison between the turbines 5, 8 of the two turbochargers can be performed via communication line 36.

In addition, an exhaust recycling device 27 is provided which comprises return lines 28, 29 with shutoff valves 30, 31. The first return line 28 returns exhaust from the first row of cylinders 2 to the common intake line section 12 and correspondingly the second return line 29 returns exhaust from the second row of cylinders 3 to the common intake line section 12. Shutoff valves 30, 31 are controlled by control signals that are transmitted over signal lines 32, 33 from regulating unit 24.

In order to supply both rows of cylinders 2, 3 equally with combustion air, turbines 5, 8 of both exhaust turbochargers 4, 7 are regulated by their control members 18, 19 with the aid of control signals St1, St2 of regulating lead unit 24 in such fashion that a desired turbine power for the two turbines 5, 8 is set. As a result, a desired air supply to each row of cylinders 2, 3 is provided. For regulation, state parameters Z1, Z2 are measured in the inlet area of compressors 6, 9 and supplied to a part 34 designed as a difference former in which the difference between the two state parameters Z1, Z2 is determined as a resultant state parameter Z. In this design, part 34 forms a part of regulating unit 24.

Alternatively, part 34 can be designed as a difference-measuring member with which the difference between the measured values representing the state parameters Z1, Z2 can be measured directly. The difference is then supplied as a state parameter Z to regulating unit 24 via signal line 35.

The air mass flow at the compressor inlet, the rpm of the exhaust turbocharger, or the pressure that prevails at the inlet of a diffuser of the turbine can be measured as state parameters.

In regulating unit 24, the state parameter Z is prepared for generating the control signals St1, St2. Regulating unit 24 communicates with a memory 37 in which a compressor characteristic map is stored. The setpoint can be read from the compressor characteristic map as a function of the operating state of the engine and processed in regulating unit 24 for comparison with state parameter Z. In particular, by a simple comparison of the state parameters with the setpoint, especially with the zero setpoint, control signals St1, St2 can be generated for control members 18, 19 of the variable turbine geometries.

The regulating unit 24 can be supplied with the boost pressure P2S via signal line 88 as an additional parameter to be considered.

Set compressor operating limits can be taken into account in regulating unit 24 in order to avoid inadmissibly high loads. By observing the compressor operating limits, the positions of the turbine guide grids 16, 17 of the two turbines can be prevented from drifting too far apart. With difference regulation, the following exhaust turbocharger 7 can be controlled so that a maximum admissible distance is maintained between the operating points of both compressors.

Figure 2:
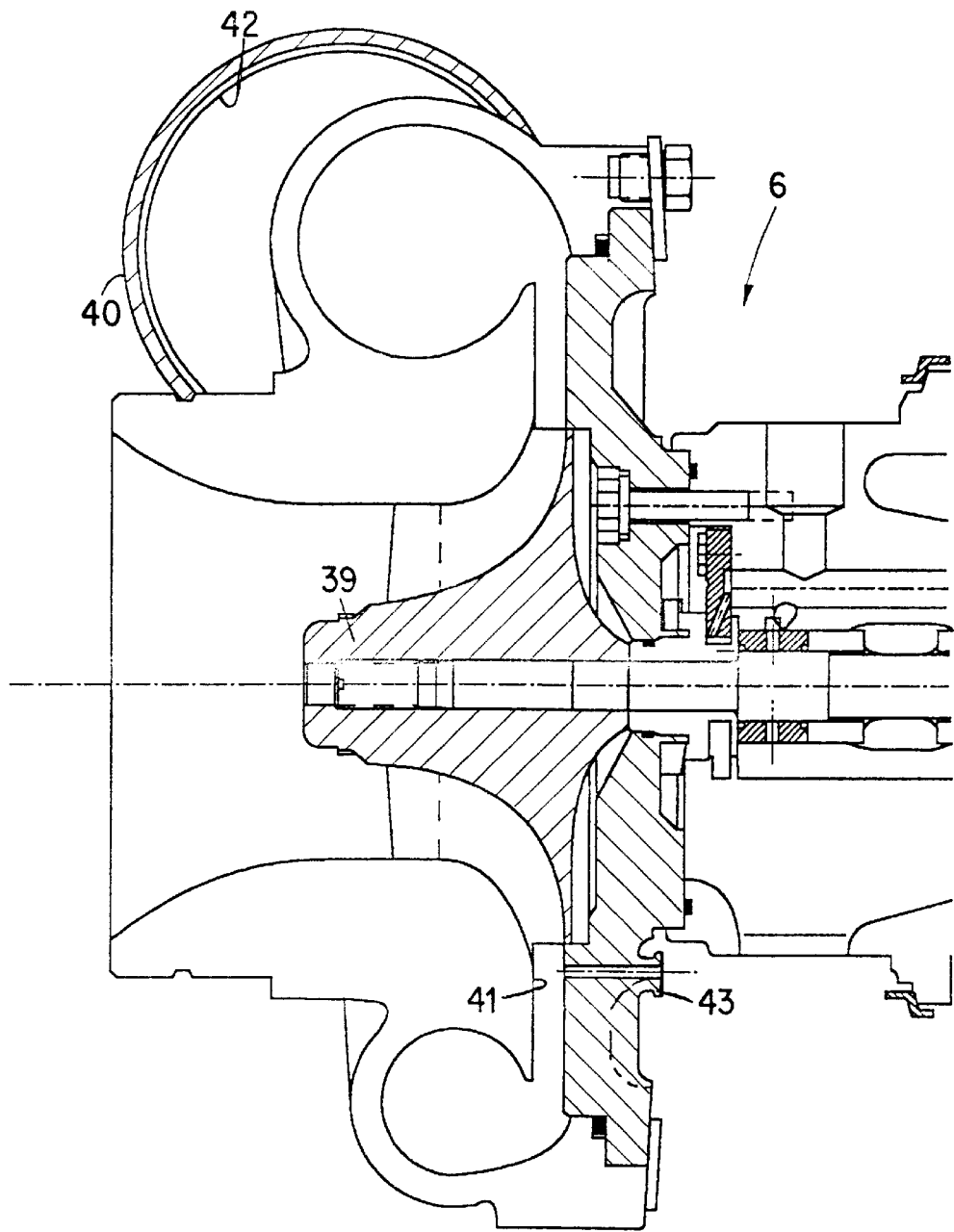
FIG. 2 is a section through a compressor of an exhaust turbocharger.

FIG. 2 shows in a sectional view a compressor 6 that has a compressor wheel 39 and a diffuser 40 which serves to slow down the air accelerated by the compressor wheel as much as possible without losses, causing the pressure and temperature of the air to rise. In the vicinity of diffuser inlet 41, a pressure sensor 43 for recording the diffuser pressure is located in a housing bore. The diffuser pressure is supplied as a state parameter to the difference former 34 in which the state parameter is thus formed by difference formation between the diffuser pressures of the two compressors.

The compressed and heated air leaves compressor 6 through diffuser outlet 42.

The method and apparatus can be used both for operation with acceleration and for engine braking operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating a supercharged internal combustion engine having a first and a second row of cylinders with first and second exhaust turbochargers being respectively associated with said first and second row of cylinders, the method comprising the acts of:
   providing the first and second exhaust turborchargers with variable turbine geometries;
   measuring a state parameter in a vicinity of a compressor for each of the first and second exhaust turbochargers;
   applying a defined control law to the state parameters to form a regulating parameter;
   supplying the regulating parameter as a control signal to control members respectively associated with the first and second exhaust turbocharger, which control members affect a variable turbine geometry cross-section of at least one respective exhaust turbocharger; and
   conducting a signal exchange between the control members for matching between the variable turbine geometries of the first and second exhaust turbochargers.

2. The method according to claim 1, wherein the act of forming the regulating parameter comprises the act of forming a differential value of the state parameters from the first and second exhaust turbochargers.

3. The method according to claim 2, wherein the differential value is regulated to a reference value.

4. The method according to claim 3, wherein the reference value is substantially equal to zero.

5. The method according to claim 1, wherein the act of measuring the state parameter comprises the act of measuring a value proportional to an air mass flow through a compressor.

6. The method according to claim 1, wherein the act of measuring the state parameter comprises the act of measuring an air mass flow at a compressor inlet.

7. The method according to claim 1, wherein the act of measuring the state parameter comprises the act of measuring an rpm of the exhaust turbocharger.

8. The method according to claim 1, wherein the act of measuring the state parameter comprises the act of measuring a diffuser pressure in a vicinity of a diffuser's end area.

9. The method according to claim 1, further comprising the act of reading a setpoint out of a compressor characteristic map stored in a regulating unit, said setpoint being compared with the regulating parameter.

10. An arrangement for regulating a supercharged internal combustion engine having first and second rows of cylinders and first and second exhaust turbochargers, each being associated with a respective one of said first and second rows of cylinders, along with a regulating unit which generates a control signal factoring into account state parameters characterizing an operating state of the engine, the arrangement comprising:
    first and second turbines, each having a variable turbine geometry, respectively associated with the first and second exhaust turbochargers;
    sensors located in a vicinity of compressors respectively associated with the first and second exhaust turbochargers, said sensors generating measured signals representing state parameters of the engine;
    control members respectively associated with the turbines for influencing the variable turbine geometries thereof;
    wherein the regulating unit compares the measured signals with a setpoint for generating control signals which can be supplied to the control members; and
    a communication line provided between the control members of the variable turbine geometry of the two turbines to allow a signal exchange.

11. The arrangement according to claim 10, wherein the sensors are pressure sensors arranged in a vicinity of an inlet of a diffuser of the compressors for recording a diffuser pressure.

12. The arrangement according to claim 10, further comprising an exhaust recycling device through which an exhaust from an exhaust line of the engine is returnable to an engine intake.

13. The arrangement according to claim 12, further comprising a shutoff valve located in a return line of the exhaust recycling device.

14. The arrangement according to claim 10, wherein intake lines of an intake section downstream of the compressors of the exhaust turbochargers terminate in a common intake line section.

15. The arrangement according to claim 14, further comprising a boost air cooler arranged in the common intake line section.

16. The arrangment according to claim 10, wherein exhaust lines of the first and second rows of cylinders are coupled with one another.

* * * * *